(12) United States Patent
Miglio et al.

(10) Patent No.: US 9,169,995 B2
(45) Date of Patent: Oct. 27, 2015

(54) LIGHTING SYSTEM

(75) Inventors: Leonida Miglio, Milan (IT); Francesco Tassone, Correzzana (IT); Franco Fattorini, Cavallasca (IT); Raffaello Nemni, Soronno (IT); Pierangelo Pasquettin, Bregnano (IT); Sonia Pasquettin, legal representative, Como (IT); Loretta Pasquettin, legal representative, Como (IT); Elisa Pasquettin, legal representative, Como (IT); Irene Pasquettin, legal representative, Como (IT)

(73) Assignee: UNIVERSITA' DEGLI STUDI DI MILANO BICOCCA, Milan (IT)

( * ) Notice: Subject to any disclaimer, the term of this patent is extended or adjusted under 35 U.S.C. 154(b) by 31 days.

(21) Appl. No.: 13/876,327

(22) PCT Filed: Sep. 26, 2011

(86) PCT No.: PCT/EP2011/004818
§ 371 (c)(1),
(2), (4) Date: Jun. 14, 2013

(87) PCT Pub. No.: WO2012/041480
PCT Pub. Date: Apr. 5, 2012

(65) Prior Publication Data
US 2013/0271985 A1    Oct. 17, 2013

(30) Foreign Application Priority Data
Sep. 28, 2010  (IT) .............. MI2010A1761

(51) Int. Cl.
*F21V 9/16*   (2006.01)
*F21V 13/02*  (2006.01)
*G02B 6/00*   (2006.01)
*F21V 8/00*   (2006.01)
*B32B 27/00*  (2006.01)

(52) U.S. Cl.
CPC ............. *F21V 13/02* (2013.01); *B32B 27/00* (2013.01); *F21V 9/16* (2013.01); *G02B 6/00* (2013.01); *G02B 6/0003* (2013.01)

(58) Field of Classification Search
CPC ........... F21V 13/02; F21V 9/16; F21K 9/52; G02B 6/0003; G02B 6/0041; G02B 6/0073
USPC .................... 362/84, 612, 615, 629, 339
See application file for complete search history.

(56) References Cited

U.S. PATENT DOCUMENTS

| | | | |
|---|---|---|---|
| 7,293,889 B2* | 11/2007 | Kamiya et al. | 362/84 |
| 7,481,562 B2* | 1/2009 | Chua et al. | 362/612 |
| 7,661,841 B2* | 2/2010 | Kurihara et al. | 362/231 |
| 7,954,989 B2* | 6/2011 | Fan et al. | 362/610 |
| 8,128,249 B2* | 3/2012 | Skipor et al. | 362/84 |
| 8,182,128 B2* | 5/2012 | Meir et al. | 362/612 |
| 8,226,263 B2* | 7/2012 | Van Woudenberg et al. | 362/231 |
| 8,477,259 B2* | 7/2013 | Kubota et al. | 349/65 |
| 8,585,273 B2* | 11/2013 | Pokrovskiy et al. | 362/615 |
| 2006/0077686 A1* | 4/2006 | Han et al. | 362/610 |
| 2012/0182715 A1* | 7/2012 | Li | 362/84 |

FOREIGN PATENT DOCUMENTS

WO    WO 2005/100016 A2    10/2005

* cited by examiner

*Primary Examiner* — Peggy Neils
(74) *Attorney, Agent, or Firm* — Greer Burns & Crain, Ltd.

(57) ABSTRACT

The present invention relates to a device to convert the blue light from solid-state sources into white light, and includes a transparent polymer matrix with a laminar structure, diffusing particles and phosphors.

12 Claims, 4 Drawing Sheets

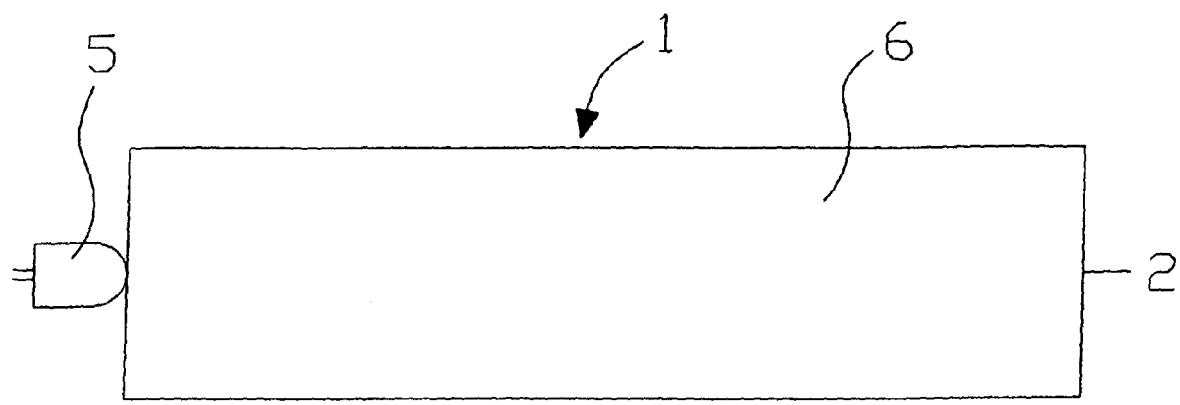
fig.1
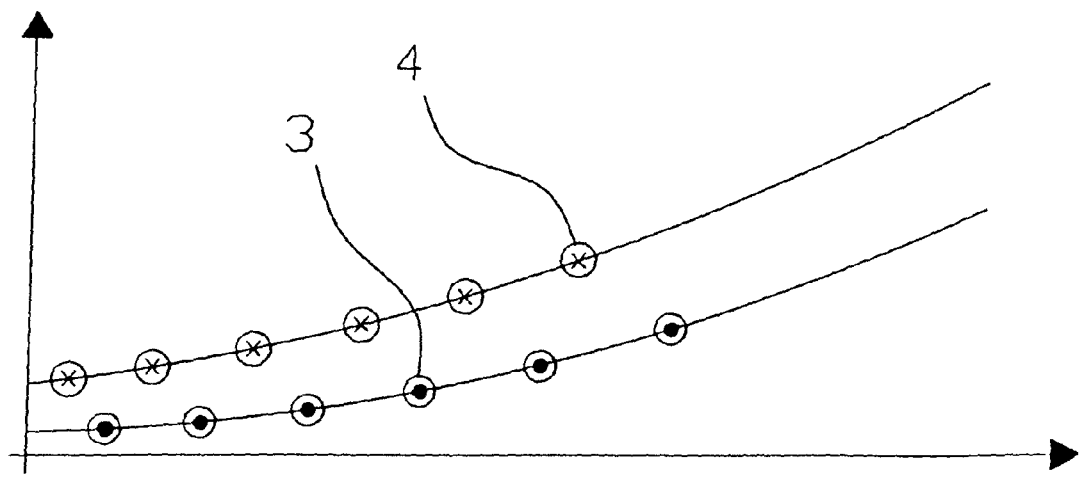
fig.1 bis

LIGHTING SYSTEM

AIM OF THE INVENTION

The following invention relates to a lighting system. In particular, it relates to an illuminating device with a transparent polymer matrix with laminar structure, which includes diffusing particles and phosphors to convert blue light from solid-state sources into white light.

STATE OF THE ART

Diffuse light from a window which is not directly exposed to sunlight is known to produce the most comfortable illumination. On the contrary, typical light sources are always concentrated in the form of point sources or linear sources, and when directly viewed produce a hurting and disturbing glare. When solid objects are illuminated from these sources, the quality of illumination is also lower compared to that produced from diffuse light because the shadows which are produced by concentrated light sources are also sharp and disturbing. The common solution to reduce glare is to place diffusers in front of light sources. However, improvement of lighting in the dark shadows is minimal, as the size of diffusers is typically rather limited. In order to solve this problem, the size of the light source should be increased considerably. However, in a conventional system we would need to considerably increase the distance of the diffuser from the concentrated source, obtaining a cumbersome illumination system having a problematic thickness. Wider area sources of light have been described in the art in the form of flat panels which uniformly radiate light from their surface. In a simple implementation, a number of linear fluorescent sources are covered with a diffuser panel in order to obtain a relatively flat and diffused light source. In this case, it is difficult to obtain good uniformity of intensity over the panel, and the thickness and weight of the system remain problematic.

Recently, a number of other less bulky solutions have been developed for use as backlights in LCD panels or advertising displays. Here, few linear light sources are used to convey light into the side of a transparent panel, and light guidance in the panel is used in order to transport the light over it. A number of systems are described in the art for extracting light with uniform intensity from the planar light guide. Typically, small micrometric dots are printed over the panel, or a wedge-shape is given to the panel. Another diffusing panel is still used over the transparent one in order to improve the uniformity of the emitted light intensity, especially in the case that imprinted dots are used as diffusers, due to their disturbing point-like nature.

In another approach described in WO2007047684, a combination of the diffusion and extraction effect is exemplified by the use of diffusing particles inside the transparent matrix. In this document it is shown that an appropriate non-uniform distribution of these particles over the panel is to be used in order to obtain a uniform intensity of the extracted light. In particular, more diffusing particles are placed where the intensity of light traveling inside the panel is lower, that is, away from the edge of the panel where the light sources are placed. An additional advantage of such a method is that the panel appears to be transparent, because the diffusion effect takes place over the size of the panel, which is typically relatively large (at least several tens of centimeters), whereas the diffusion effect over its thickness of around a centimeter is practically negligible. In this way, an unobtrusive, wide and flat source of light can be obtained.

It is known in the art that white light emitting diodes (LEDs) can be used as a replacement for linear fluorescent tubes to convey white light into the transparent waveguide plate. Indeed, such solid state sources are generally emerging as a viable alternative to conventional light sources such as linear fluorescent tubes for all kinds of illumination purposes. In particular, blue diodes based on GaN are showing ever increasing efficiencies and have much longer lifetimes than typical fluorescent tubes. Moreover, they have further environmental advantages: they include no poisonous mercury, and do not show harmful residual ultraviolet emission as fluorescent and other discharge tubes do. White light with reasonable efficiency and good color rendering is routinely achieved by placing a phosphor layer close to the light source, or dispersing phosphor particles in the transparent optical body surrounding the solid state source.

It is well known in the art that there are a number of problems related to the quality of color and efficiency of white LEDs, which in the end results into a relevant increase of cost of the light source when strict selection of the color shade of white light is required.

It is known in the art that blue LEDs can be used in combination of phosphors at the surface of a flat panel to produce white light from the panel. In particular, WO2007105853 describes a method to produce a plastic sheet in which phosphors are uniformly dispersed. It is possible to show using validated commercial simulation software that when such a sheet is attached to a flat panel light-guide using blue LEDs as light sources, a wide area white light source is obtained, however, the uniform distribution of phosphors in the plastic sheet over the panel results into a non-uniform white color over the surface.

An analogous problem is known in the art for conventional high brightness white LEDs, where the white light color is not a uniform function of the light emission angle. It is well known that these effects are very disturbing, and especially evident in large panels. A trivial solution which would mitigate the problem would require sectioning a large panel in smaller panels, all equipped with independent blue sources. However, this solution increases the complexity and cost of the product, and is not aesthetically welcome. Moreover, the increased complexity of the wide panel made from joining several smaller panels results into an increase of light lost from the panel edges, and therefore to a decrease in the efficiency of the illumination system.

DESCRIPTION OF THE INVENTION

The present invention advantageously solves the problems of the devices known in the art with an illuminating device composed of one or more solid slabs of transparent polymer material containing first phosphor particles and second diffusing particles, and one or more blue LEDs. These blue LEDs are arranged around the perimeter of this slab and the first phosphor particles and second diffusing particles have a distribution over the slab with increasing density as a function of increased distance from the blue LED. These particles have lower density near the LEDs and this density increases gradually away from the blue LEDs, which are preferably positioned along the perimeter of this slab. The solid illuminating device of the present invention shows diffusion and fluorescence of blue light whose inverse has a trend of decreasing linearly or substantially linearly as a function of the increasing distance from the blue LED of the point of the object of this invention in which the measurement is made. This characteristic of diffusion and fluorescence is due to the presence of diffusing particles and phosphor.

In particular, it was noted that the slope of these trends is equal or substantially equal. The phosphor and diffusing particles are preferably smaller than the wavelengths of visible light in the device object of this invention. The blue LEDs are distributed in the device in an even fashion along the perimeter of the slab of transparent polymer material that is preferably poly-methyl-meta-acrylate (PMMA) or poly-styrene (PS) or poly-carbonate (PC). The invention described above is also confirmed with experimental tests carried out using commercial validated software and outlined below. Surprisingly, diffusers made of $SiO_2$, $TiO_2$ or ZnO, or transparent polymers such as poly-methyl-meta-acrylate, poly-styrene, poly-carbonate or fluorurated polymers having low index of refraction had the advantage of giving the desired diffusion effect when used in easily manageable quantities in the production of the composite material, while phosphors made of inorganic phosphor materials preferably $Y_{3-x-y-}Ce_xGd_yAl_5O_{12}$ with $0<x+y<3, 0<x<3, 0<y<3$, $Sr_6P_5BO_{20}$:Eu, $MgWO_4$, $Sr_2P_2O_7$:Sn(II), $(Ca,Zn,Mg)_3(PO_4)_2$:Sn, $(Sr,Mg)_3(PO_4)_2$:Sn, $Sr_5F(PO_4)_3$:Sb,Mn, $BaMg_2Al_{16}O_{27}$:Eu(II),Mn(II), or organic phosphor materials, preferably phtalocyanines, pyridines, or azo-pigments or semiconductor fluorescent nanoparticles, preferably made of CdS, CdSe, ZnS, ZnSe, or InP had the advantage of giving, when used in appropriate quantities, emission from the slab of white light with optimal color rendering, i.e. such as to allow the correct identification of color of colored objects illuminated by such a white light.

EXPERIMENTAL PART

Example 1

We set the simulator to reproduce a dispersion of $TiO_2$ diffusing particles in PMMA, having an average size of 50 nm, in 10 increasing concentrations: 1 part per million by volume to 10 parts per million using the following formula $1/C = 1\ ppm^{-1} - 0.1\ ppm^{-1}\ (n-1)$ where "C" represents the concentration of diffusing particles and n is the index that identifies each of these ten concentrations. With this material we simulated a slab with thickness of 1 cm and a size of 1 m×1 m, on one edge of which at a regular distance of about 5 cm several blue LEDs are placed. The edge of the slab on which the LEDs were assumed to be positioned had the smallest density of nanoparticles. We then simulated lighting of LEDs connected in series, in which then passed the same current in each LED. The intensity of scattered light outside the slab surface was then measured. In FIG. 2 we report the variation of this intensity as a function of distance from the illuminated edge. Note the good uniformity of this intensity thanks to the increase of the density of diffusing particles with increasing distance from the illuminated edge. Finally we set the simulator to reproduce the application on the slab of a thin sheet of PMMA where a dispersion of yellow phosphors with a uniform density was assumed. We then measured at several points the spectrum of light emitted from the slab surface containing phosphors and we have separated the contributions from blue LEDs from that of the wider spectrum due to yellow phosphors.

In FIG. 3 we report the intensity of the two spectral components thus obtained, again depending on the distance from the illuminated edge. Note how even now the blue component is not as uniform as in FIG. 2. This is due to blue light absorption by the yellow phosphors. Moreover, we remark that the two spectral components are not equally balanced over the length of the panel. In particular, the component due to yellow phosphors is too large close to illuminated edge, and too small far from it. The color of white light thus obtained is not uniform over the slab. In order to solve this problem, we also simulated a non-uniform dispersion of phosphors in PMMA (in this experiment, the yellow LUMOGEN of BASF) along with nano-particles of $TiO_2$ in 10 increasing concentrations using the following formula: $1/Cph = 80\ ppm^{-1} - 3.3\ ppm^{-1}\ (n-1)$ where "Cph" represents the concentration of phosphors and n is the index that identifies each of the ten simulated concentrations. We also changed the diffusing particle concentration, following a different formula, namely: $1/C = 1.7\ ppm^{-1} - 0.14\ ppm^{-1}\ (n-1)$. In FIG. 4 we show the two spectral components (blue and broad yellow spectrum) measured over the new slab always as functions of distance from the illuminated edge, as in FIG. 3. Surprisingly, we remark that we have been able to obtain the result of a perfect balance of the two spectral components across the whole slab and good uniformity of their intensities.

Example 2

In order to characterize the actual density of diffusing and phosphors in the slab which is the object of our simulation, we developed a measurement procedure.

We simulated a simple blue laser pointer having a well collimated spot of 2 mm, with an emission wavelength of around 470 nm, comparable with that of commercial blue LEDs. We remark however, that we might have used other wavelengths between 380 nm and 520 nm which are commercially available, obtaining the same results regarding the measurement of concentration profiles of diffusing phosphor particles as functions of the distance from the edge where the blue LEDs are applied. The beam of light from the pointer was directed perpendicularly to the slab. Because of the presence of diffusing particles and phosphors, a weak diffuse blue light and a weak yellow fluorescence was obtained in the simulation in the area crossed by the beam. We then measured the scattered light (blue, 470 nm) and fluorescence (yellow, broad-spectrum) as functions of the distance of the point from the edge of the slab where blue LEDs where assumed to be placed (of course we assumed the LEDs were powered off). The results are reported as the reciprocal of the intensity in FIG. 5. Surprisingly, we have found a clearly linear trend. In particular, the slope of the two lines is very similar. We also experimented with the commercial validated simulator of other slabs containing up to twice the concentration of phosphors of Example 1, in order to increase the yellow component of white light emitted by the slab. The tone of the measured white light is much warmer. Again we used an inverse law for distributing the phosphors, similarly to what described in Example 1, and namely: $1/Cph = 46\ ppm^{-1} - 3.1\ ppm^{-1}\ (n-1)$. We finally repeated the measurements of diffusion and fluorescence, and we again found a clearly linear trend for the inverse of the fluorescence intensity and diffusion. Furthermore, we again noted that the two slopes are substantially equal.

DESCRIPTION OF FIGURES

FIG. 1 illustrates a two-dimensional view of the device (1) object of this invention, the slab (2) of transparent polymer material (6) and one or more blue LEDs (5). In addition to this two-dimensional view, FIG. 1 bis graphically presents over Cartesian axes the distribution pattern of phosphors (3) and diffusing particles (4) as a function of the distance from the blue LEDs (5).

APPLICATIONS OF THE PRESENT INVENTION

Figure 2:
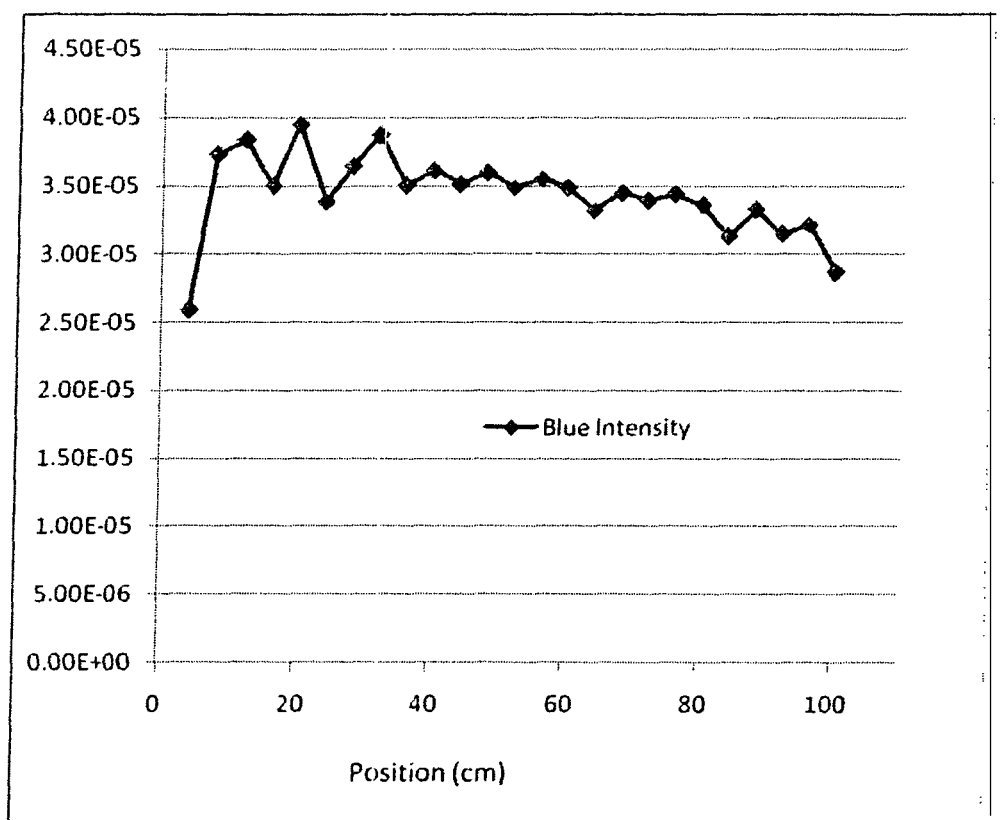
FIG. 2 shows the variation of blue light intensity measured for a slab containing diffusing particles and lighted by blue LEDs as a function of the distance from them.
Figure 3:
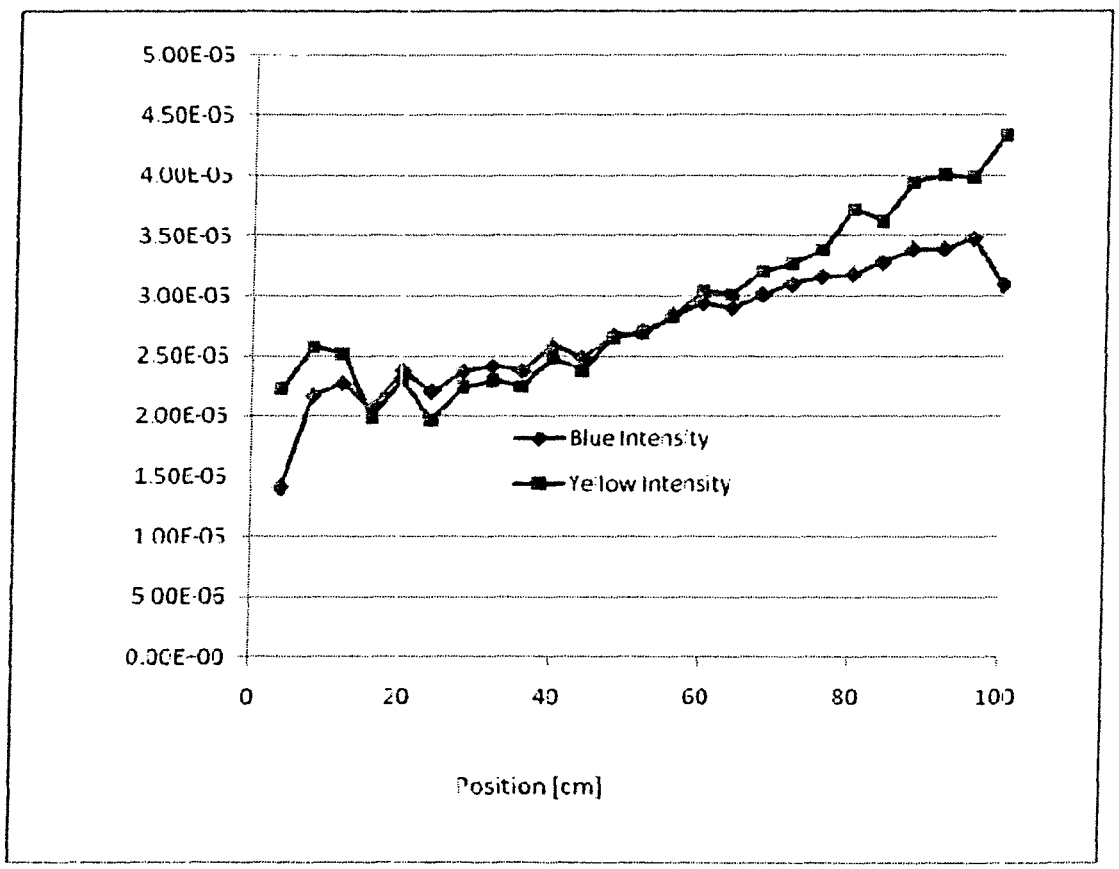
FIG. 3 shows the variation of the intensity of the spectral components of the blue and yellow light measured for the slab containing diffusing particles and a thin layer containing phosphors with uniform density, and illuminated the blue LEDs, as a function of the distance from them.
Figure 4:
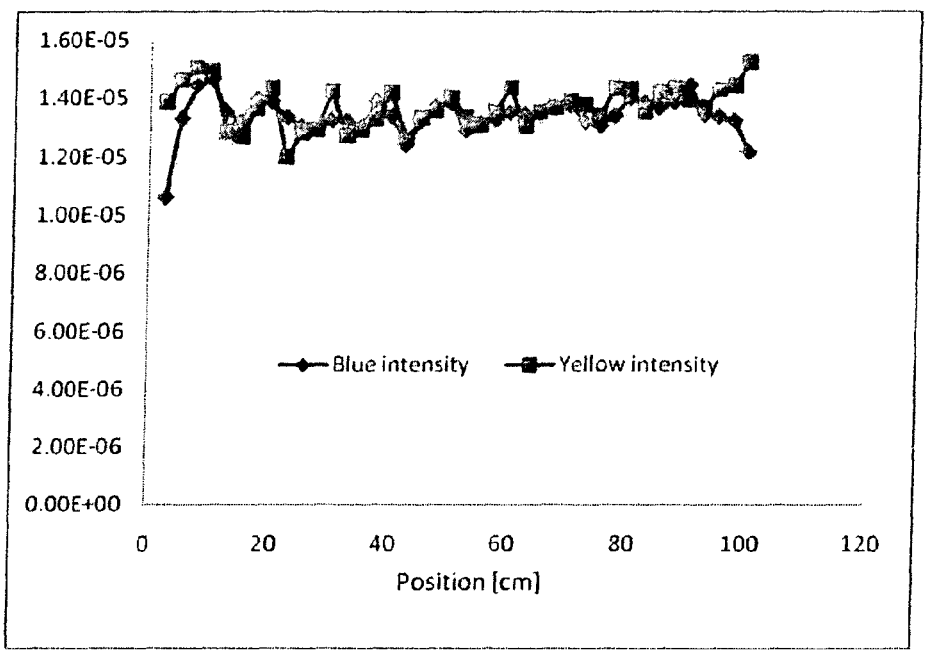
FIG. 4 shows the variation of the intensity of spectral components of the blue and yellow light measured for the slab containing phosphors and diffusing particles, and illuminated with blue LEDS, as a function of the distance from them.
Figure 5:
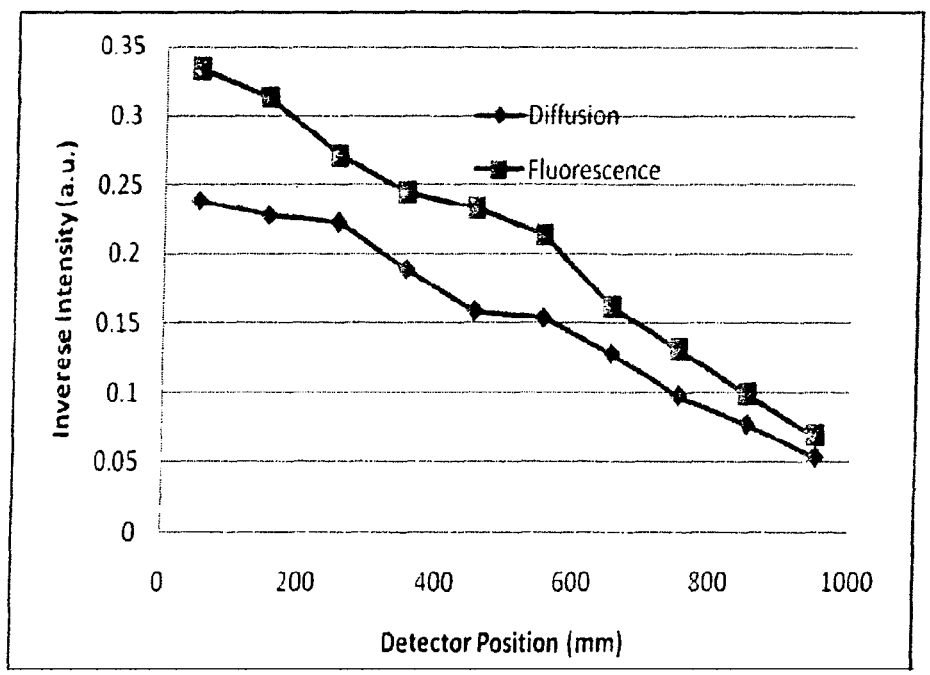
FIG. 5 depicts the trend of the inverse of the diffused and fluorescence light intensity measured as described in the text, depending on the distance from the blue LEDs. The solid illuminating device is susceptible to numerous variations in particular regarding the types of phosphors and diffusing particles without going beyond the scope of the claims below.

The invention object of this invention can be used in any sector of the lighting industry, for television displays and the like and in relation to any product that requires backlighting with white light.

The invention claimed is:

1. A solid illuminating device comprising one or more slabs of transparent polymer material, first particles of phosphors, second diffusing particles and one or more blue LEDs, wherein the blue LEDs are placed along at least one side of said slab, and further wherein the first particles of phosphors and the second diffusing particles have an inverse density distribution along the slab which decreases linearly or substantially linearly with increasing distance from the blue LEDs.

2. The solid illuminating device of claim 1, wherein the relative increase of the density of said second diffusing particles with increasing distance from the blue LEDs is larger than that with respect to the first phosphor particles.

3. The solid illuminating device of claim 1, wherein the trend lines of the inverse of the diffusion and fluorescence of blue light crossing the slab are decreasing linearly or substantially linearly with increasing distance from the blue LEDs.

4. The solid illuminating device of claim 3, wherein the trend lines of the inverse of the diffusion and fluorescence of blue light crossing the slab are decreasing linearly or substantially linearly, and with equal or substantially equal slope, with increasing distance from the blue LEDs.

5. The solid illuminating device of claim 1, wherein the first phosphor particles and the second diffusing particles have dimensions smaller than the wavelength of visible light.

6. The solid illuminating device of claim 1, wherein the blue LEDs are uniformly distributed along the perimeter of the transparent polymer slab.

7. The solid illuminating device of claim 1, wherein the transparent polymer material is poly-methyl-meta-acrylate (PMMA), poly-styrene (PS) or poly-carbonate (PC).

8. The solid illuminating device of claim 1, wherein the second diffusing particles are $SiO_2$ or $TiO_2$ or ZnO.

9. The solid illuminating device of claim 1, wherein the second diffusing particles are made of inorganic fluorescent material such as, but not limited to $Y_{3-x-y}Ce_xGd_yAl_5O_{12}$ with $0<x+y<3$, $0<x<3, 0<y<3$, $Sr_6P_5BO_{20}$:Eu, $MgWO_4, Sr_2P_2O_7$: Sn(II), $(Ca,Zn,Mg)_3(PO_4)_2$:Sn, $(Sr,Mg)_3(PO_4)_2$:Sn,$Sr_5F(PO_4)_3$:Sb, Mn, $BaMg_2Al_{16}O_{27}$:Eu(II), Mn(II), or organic fluorescent materials such as, but not limited to, phtalocyanines, pyridines, or azo pigments, or semiconductor fluorescent nano-particles of appropriate dimensions such as, but not limited to, CdS, CdSe, ZnS, ZnSe, InP.

10. The solid illuminating device of claim 1, wherein the second diffusing particles are transparent polymers.

11. The solid illuminating device of claim 1, wherein the second diffusing particles are comprised of poly-methyl-meta-acrylate, poly-carbonate, or poly-styrene.

12. The solid illuminating device of claim 1, wherein the second diffusing particles are comprised of a fluorurated polymer with a low index of refraction.

* * * * *